July 11, 1961  W. ECKHARDT  2,991,740
METHOD AND APPARATUS FOR SHAPING FLAT STRIPS
OF MATERIAL INTO TUBULAR BODIES
Filed Jan. 7, 1958  4 Sheets-Sheet 1

INVENTOR
WILHELM ECKHARDT

BY Dicke and Craig

ATTORNEYS.

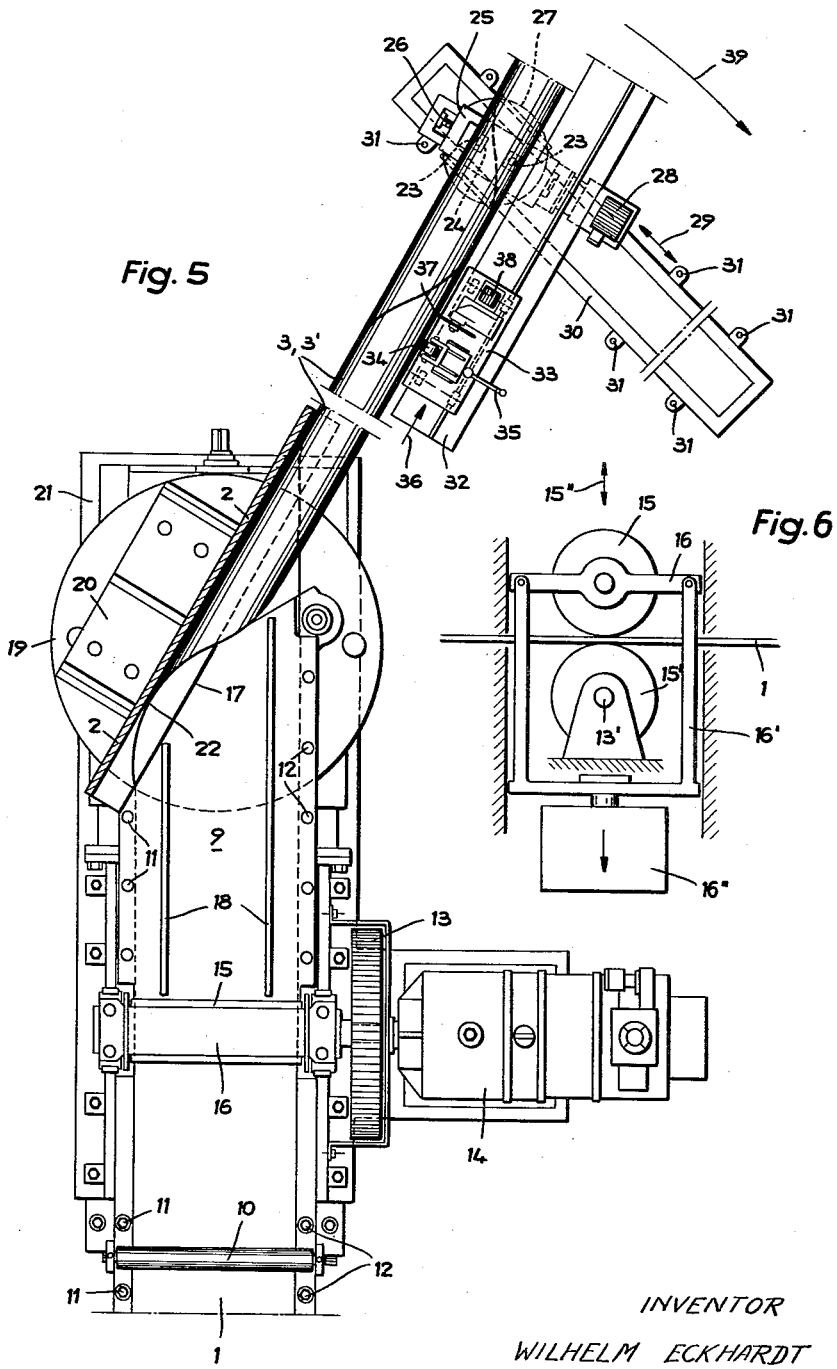

July 11, 1961 W. ECKHARDT 2,991,740
METHOD AND APPARATUS FOR SHAPING FLAT STRIPS
OF MATERIAL INTO TUBULAR BODIES
Filed Jan. 7, 1958 4 Sheets-Sheet 4

INVENTOR
WILHELM ECKHARDT
BY Dicke and Craig
ATTORNEYS.

2,991,740
METHOD AND APPARATUS FOR SHAPING FLAT STRIPS OF MATERIAL INTO TUBULAR BODIES

Wilhelm Eckhardt, Rue Arcade 7, Paris VIII, France
Filed Jan. 7, 1958, Ser. No. 707,590
Claims priority, application Germany Jan. 15, 1957
2 Claims. (Cl. 113—35)

The present invention relates to a method and apparatus for shaping flat strips of material into tubular bodies, especially for producing tubes, pipes, boilers, and the like.

According to the prior art, it is already known to produce tubular bodies such as tubes, pipes, and the like from flat strips of material of a certain width by feeding such a strip to a shaping tool which consists of a slotted hollow cylinder with a mandrel disposed therein, the outer diameter of which corresponds substantially to the inner diameter of the hollow body to be produced, while the inner diameter of the slotted cylinder substantially corresponds to the outer diameter of the tubular body. This method of production has the disadvantage that it entails very great frictional forces and therefore requires considerable power to carry it out.

According to another known method of production the shaping tools are made in the form of several rollers, two or more of which act upon the wide outer side of the strip to be bent and another roller which acts upon the wide inner side of the strip. However, because of the provision either of a mandrel or of an inner roller within the hollow cylinder, these two mentioned methods do not permit the production of tubular bodies of a relatively small diameter. Also, since the mandrel or the inner roller can only be mounted at one end, it is impossible to produce tubular bodies of a comparatively great wall thickness.

In both of these known methods it is necessary to feed the strip to the respective shaping tools at a specific angle relative to the longitudinal axis of the shaping tools which depends upon the width of the strip and the diameter of the hollow body to be produced. If this angle is correctly adjusted, the edges of the curving strip will abut against each other so that they can then be properly welded together. If the strip is of an exactly uniform width at all points transverse to its length, there will theoretically be no difficulties. In actual practice, however, it will be found that the width of even the most accurate strip of material varies by 1% in either direction so that despite the most accurate adjustment of the feeding angle the edges to be welded together will be in actual contact with each other at very few points so that it will be quite difficult to weld the edges properly to each other by an automatic welding operation. In order to insure that the width of the strip will be constant throughout its length, it is necessary in these methods that the edges of the strip be worked upon before it may be fed toward the shaping tool or tools. Furthermore, the smaller the angle is made between the feeding direction of the strip and the main axis of the shaping tool, the greater will be the danger that the strip might also become deformed in a direction transverse to the direction to its movement so that the width of the slit between the edge of the part of the strip which is being fed to the tool and the edge which has already been curved will vary, with the result that the two edges will not properly abut against each other or at least be sufficiently close to each other to be securely welded together.

It is the principal object of the present invention to provide a method and apparatus which will completely overcome the above-mentioned difficulties and disadvantages of the known methods and apparatus.

In order to attain this object, the present invention provides an apparatus which consists of a shaping tool to which the strip of material is fed at a certain angle to the longitudinal axis of the tool by means of rollers, at least one of which is driven, and guiding means which are designed to prevent the strip from bending or buckling. The apparatus according to the invention further consists of a slide rest or the like which is mounted at a point behind the shaping tool and serves to guide the finished hollow body from the apparatus. The latter is also designed so as to permit an adjustment of the angle between one longitudinal edge of the strip which is being fed to the shaping tool and the longitudinal axis of the latter, and to permit the curved portions of the strip to be welded together while still within the area of the shaping tool.

The method according to the present invention consists in the use of a shaping tool which is half-open and in the form of an elongated half shell, in inserting the strip of material into this shaping tool from its open side and at an angle which is smaller than the angle which would have to be set up in order to produce a tubular body with an outer diameter which corresponds to the diameter of an imaginary roller which is in contact with the entire work surface of the shaping tool, in mounting the shaping tool so as to be pivotable during the operation relative to the feeding means, and in mounting the slide rest which supports the finished tubular body by means of a lunette or other suitable backrest so as to be pivotable together with the shaping tool and also relative thereto. According to a specific feature of the invention, the shaping tool and the slide rest with the lunette thereon are preferably mounted on separate turntables, and the turntable of the slide rest is preferably mounted on a stationary frame so as to be slidable thereon. In order to reduce the pivoting of the shaping tool and the slide rest with the lunette as much as possible during the operation, it is advisable to guide the strip during its feeding movement by means of rollers, the axes of which extend vertically to the plane of the strip, to mount these rollers in pairs along both edges of the strip, and to provide at least those rollers which are mounted near the shaping tool at a distance from each other which corresponds to the smallest width of the strip which is admissible for a proper shaping and welding operation. In order to cut off complete sections of the tubular body, it is advisable to secure a table or the like on the slide rest on which a carriage is slidable in a direction transverse to the direction of the adjusting movement of the slide rest, and to mount a cutting mechanism on this carriage. The cutting mechanism is movable in a direction transverse to the direction of movement of the carriage to permit the finished tubular body to be cut into sections of any desired length. The carriage supporting the cutting mechanism may be held in engagement with the finished tube, for example, by means of a roller, so as to follow the movement of the tube from the shaping tool to permit the tubular sections to be cut off while the shaping operation progresses.

It is a surprising fact that if the butt joints of the strip are connected to each other by a weld of a thickness which is greater than the thickness required in order to attain a weld stronger than the unwelded metal in the strip, it will be possible to attain a tubular body, for example, a pipe or a boiler, which has a solidity greater than that of the wall thickness of the material of the respective body itself. In other words, a tubular body with a welded seam according to the invention has a greater solidity and strength, and can withstand a greater internal pressure than a similar seamless body. Such an increase in the solidity of the tubular body made according to the invention will be attained especially if the weld is made in the form of a bead or rib.

According to the known methods and apparatus as previously described, the presence of the mandrel or of the roller which supported the curving strip at the inside of the shaping tool did not permit the strip edges to be welded together at their points of engagement unless the strip was fed to the shaping tool in such a manner that the strip portion which was already curved would approach the flat, still unbent strip portion from below. Consequently, the welding operation could only be carried out from the outside. However, after the strip edges have thus once been welded together, it is ordinarily no longer possible to weld the seam also from the inside of the tubular body since the welding tool cannot be inserted therein. A really secure weld which should be applied from both sides could therefore previously not be attained.

It is therefore another very important object of the present invention to devise a method and apparatus which permits the adjacent edges of the tubularly curved strip to be welded together not only from the outside, but also from the inside. Another object of the invention is to carry out such double welding operation in a very simple and inexpensive manner. These objects may be attained by devising a shaping tool which does not require any mandrel or roller at the inside of the tubularly curving strip and which is open at one side as previously described. It will then be possible to have an easy access from one lateral side to the inside of the tubularly curved portion while the bending operation progresses, and thus to weld the strip edges together at first from the inside. If it should then be desired to weld the tubular body also from the outside in order to attain a perfect, absolutely tight seam, such external welding may be easily carried out at any point subsequent to that where the internal weld was previously applied, since through such internal welding the strip edges are secured to each other and the seam can no longer be ripped apart.

If the known methods and apparatus as previously described were first used to make tubular bodies of a certain diameter, and other bodies of a larger or smaller diameter were then to be made, it was necessary to replace the shaping tool previously used by one which had either a larger or smaller diameter, and, provided that the strip to be used had the same width as that used for making the previous bodies, to change the angle at which the strip of material was fed to the shaping tool. If the strip to be used had the same width as applied in the previous operation for making tubular bodies of a different diameter, it was sometimes possible to maintain the feed angle of the strip relative to the shaping tool. Therefore, if the width of the strip material remained the same and the shaping tool was mounted in a stationary position, it was necessary not only to replace the shaping tool for one of a different dimension, but also to pivot the extremely heavy feeding mechanism so as to adapt the angle between the feeding mechanism and the main axis of the shaping tool, that is, for example, the central axis of three rollers which formed the shaping tool, to the radius of curvature of the tube to be produced. In these prior methods, the diameter of the finished tubular body, for example, a pipe, boiler, or the like, depended upon the position of the rollers relative to each other. This relative position was, in turn, dependent upon a specific feed angle of the strip material. Since this feed angle was not changed during the operation of the apparatus, and since the slot between the strip edges which were to be welded together therefore varied in width because of small changes in the width of the strip material, it was also necessary to vary the width of the weld. Furthermore, if the slit between the strip edges become too wide, there was a considerable danger that the weld was not secure. It was therefore necessary to check the finished tubular body carefully for tightness and solidity of the welded seam and to seal weak or leaky points by additional welding.

The present invention is based upon the new finding that, after the apparatus has once been set for making a tubular body of one diameter, an adjustment of the feed angle of the strip material relative to the shaping tool can result in a tubular body of a different diameter only if the shaping tool has a curved surface which acts upon the strip only at one side (substantially a tangential line contact) thereof in the direction of its width. It has further been found according to the invention that it will be fully adequate to use a half-open tool which has a radius of curvature approximately equal to the radius of the largest tubular body which is intended to be made on the apparatus. Since the same shaping tool may thus be used to make tubular bodies of any diameter smaller than twice the radius of the tool, the expense previously required for making separate tools for each different tube diameter is now considerably reduced, and the time previously required to change the tools is also saved. Furthermore, since the shaping tool may be completely open at one side, it is possible closely to observe the shaping process and to check that it proceeds properly. Contrary to the general previous assumption of any person familiar with the art of producing closed tubular bodies from flat strips of material, it has therefore been found that it is very well possible to produce such bodies of different diameters merely by changing the feed angle of the strip material relative to the axis of the shaping tool. Furthermore, it has been found that, if the feed angle is constantly changed while the strip material is being fed to the shaping tool, it is also possible to use the same tool in order to make conical tubes, even though the generating surface of the shaping tool forms a part of a cylinder.

In place of a shaping tool which is made in the form of a half shell, it is also possible under certain conditions depending upon the quality and solidity of the strip material and of the finished tube to use two or more rollers which only act upon one side of the strip material along the width thereof.

While in accordance with the above description it is necessary to insure that the strip will always be fed to the shaping tool at an angle of such an inclination that the curved part of the strip will engage against the part which is still straight, it is possible to limit the adjustment of the feed angle to a minimum by the provision of a plurality of rollers at both sides of the feed path of the straight strip, and of suitable means for adjusting the distance between the corresponding rollers on both sides so that at least the rollers of the closest pair in front of the shaping tool will be spaced from each other at a distance which corresponds to the smallest admissible width of the strip. If the width of the strip is, for example, 600 mm. and varies 0.5% in either direction, it would be necessary to adjust the rollers of at least the closest pair to a distance of 597 mm. However, since the width of the strip varies between 597 mm. and 603 mm., the strip will be upset along its edges and be formed with a bead or bulge thereon, and the width of the strip will thus remain constant. If the width of the strip deviates only very little from the admissible minimum of 597 mm., no bead will be formed but the edges of the strip which by nature are slightly rounded will be upset to become rectangular in cross section. The small bead on the strip edges produced by such upsetting operation will, when passing to the welding point, increase the solidity of the finished tubular body and also facilitate the welding operation since sufficient material will then be available on which the weld may be formed.

During the bending operation in the shaping tool, the cross-sectional shape and thus the width of the strip will also change, although only at a slight extent, so that the distance between the strip edges which are to be welded together will not remain perfectly constant. A constant distance between the edges to be welded together is, however, very desirable, and for arc welding it should preferably amount to 0.3 to 0.5 mm. and for induction welding to zero or even be negative in order to produce an upsetting pressure. In order to attain such a constant distance between the strip edges to be welded, it is necessary to provide suitable means which permit the feed angle at which the strip is inserted into the shaping tool to be quickly adjusted within small limits during the shaping of the strip, that is, for example, at an angle of 15 seconds within a period of one second. If the width of the strip decreases by the shaping operation, the feed angle must be enlarged, and if it should slightly decrease, the feed angle must accordingly be reduced in order to attain a constant diameter of the finished tube. For obvious reasons, it is, however, impossible to carry out such a rapid adjustment of the feed angle, that is, of the angle between the feeding mechanism and the main axis of the shaping tool, if for this purpose, the heavy feed mechanism, which often weighs several tons, has to be pivoted relative to the shaping tool. The present invention therefore provides suitable means which produce such a quick adjustment of the feed angle during the shaping process by pivoting the much lighter shaping tool relative to the feeding mechanism.

As long as a tubular body of a relatively small wall thickness is to be made of a relatively small diameter, for example, 4 inches at a wall thickness of 2 to 3 mm. or about $\frac{1}{16}''$, it will be sufficient if the supporting member carrying the finished tubular body, for example, a slide rest, be pivoted together with the shaping tool. If, however, the tubular body is to be made of a relatively great diameter of, for example, more than 10 inches, or of a relatively great wall thickness of, for example, more than 5 mm. or about $\frac{3}{16}''$, it may become rather difficult to carry out the required quick pivotal movement because of the heavy weight of the finished body. If, however, the finished tubular body is then supported by a lunette or other suitable backrest, which, in turn, is supported by a slide rest or the like, and the lunette is capable of pivoting relative to the shaping tool, the greater leverage attained if the force necessary for pivoting the tubular body together with the shaping tool is applied to the lunette or the slide rest, will not only permit a proper pivoting movement of the tubular body and the shaping tool but it may also be used to exert a constant pressure upon the strip edges at the first point where they are to be welded together. Consequently, the finished tubular body will be given a certain initial tension which will increase the solidity of the weld and of the entire body.

Further objects, features, and advantages of the present invention will be apparent from the following detailed description thereof, particularly when read with reference to the accompanying diagrammatic drawings, in which—

FIG. 5 shows a partial plan view of the apparatus according to the invention;

FIG. 6 shows a side view of the rollers which feed the flat strip of material to the shaping tool.

Figure 1:
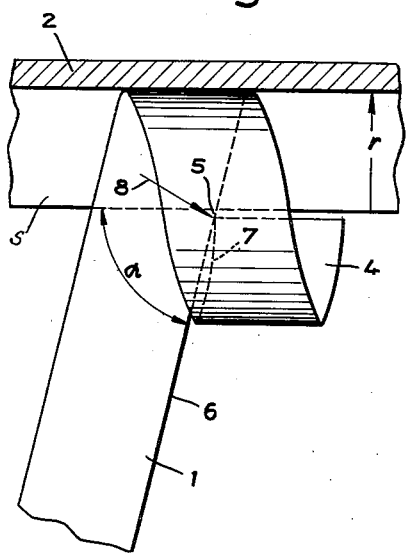
FIG. 1 shows a cross section of a shaping tool according to the invention taken along line I—I in FIG. 2, with a strip of material being fed to such tool for being shaped into the form of a tube.
Figure 2:
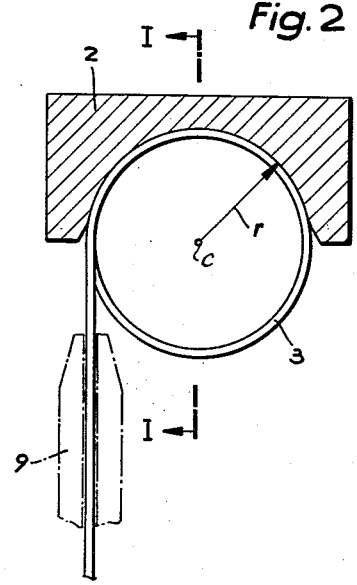
FIG. 2 shows a cross section of the shaping tool according to FIG. 1, to which a strip of material is being fed at such an angle that the radius of curvature of the tube to be made substantially corresponds to the radius of curvature of the shaping tool.

Referring to the drawings, FIGS. 1 to 4 illustrate the method according to the invention of shaping tubular bodies such as pipes, tubes, boilers, and the like. The shaping tool 2 is made, for example, in the form of a half shell with semicylindrical inner surfaces. A straight strip 1 of material is fed to the shaping tool 2 at an angle $\alpha$ which is referred to herein as the feeding angle. As shown in the drawings, it is the angle between the guided edge 6 of the flat strip and the longitudinal axis of the shaping tool 2. This longitudinal axis of the shaping tool is parallel to the axis of the finished pipe and in commercial usage the feeding angle is also referred to as the forming angle or the angle formed by the longitudinal axis of the strip and the axis of the pipe. In FIGS. 1 to 4, incl., the longitudinal axis of the shaping tool coincides with the center line $c$ of the semicylindrical inner surface $s$, and hence the angle $\alpha$ is shown as formed by such axis and the guided edge 6 of the strip. In FIGS. 1 and 2 the longitudinal axis of the shaping tool substantially coincides with both the center line $c$ of the shaping tool and the longitudinal axis of the pipe to illustrate the outer limit of such angle. However, as previously pointed out, the feeding angle $\alpha$ must be smaller than the angle shown in FIGS. 1 and 2 so that the radius of curvature of the tube or pipe 3 so produced is slightly smaller than the radius of curvature $r$ of the shaping tool 2. This has the practical effect of keeping the principal force receiving contact area between the shaping tool and the outer surface of the tube formed by the bending of strip 1 to a minimum. This is theoretically a tangential line. In such case the longitudinal axis of the pipe does not coincide with the center line $c$ of the shaping tool (see FIG. 4) but they are still parallel. Because the strip 1 is held down by a guide member 9 along a line 17 which extends along the front edge of the shaping tool 2 (see FIG. 5), the bending of the strip will take place between such guide member and the tangential line of maximum contact. As is obvious from an inspection of the drawings this tangential line of contact will, as viewed in FIG. 4, start at the 9 o'clock position and shift to somewhere between the 12 and 1 o'clock position as a first convolution is formed and the first inside weld made at 5'. The feeding angle, while still being as small as defined above, also varies depending upon the width of the strip 1 and the final pipe diameter. For example, if the final diameter sought is 4½" and the width of the strip is 8", the feeding angle may be about 54°35'. If the width of the strip be increased to 10" the feeding angle will decrease to about 45°. In commercial practice this feeding angle varies from about 44° to 67°. The most important feature is that it be limited as above described. Another reason for making the radius of curvature of the tube or pipe 3 slightly smaller than the radius of curvature $r$ of the shaping tool 2 is to provide room and sufficient flexibility between tube and tool to permit the slight swinging of the tube by the slide rest 25 as hereinafter explained. After the front end 4 of strip 1 has been shaped in tool 2 and strip 1 continues moving into the tool at the same angle $\alpha$, this curved end 4 will abut at the point 5 against the right edge 6 of strip 1 and will remain in engagement with the edge even after the same is also bent into a curved shape. If the two edges 6 and 7 are then secured together by internal welding in the direction as shown by arrow 8 for which purpose a tack-weld would actually be sufficient, it will be possible to maintain the shape of the tube thus produced, and the seam then forming behind the welded point 5 may then be adequately sealed at one or more subsequent points, preferably by welding from the outside. As heretofore described, if the feed angle is constantly uniformly increased in small increments the diameter of the tube will also gradually increase toward the back end to make a conical tube. Likewise, if such angle is constantly uniformly decreased in small increments the diameter will be gradually decreased. Since the tack weld at successive intervals rigidly fixes the diameter there will be no change in the diameter of the tube from the last made tack weld to the front end. This gradual increase or decrease in diameter so obtained should not be confused with the quick adjustment of the shaping tool which, as described, takes place in accordance with minute changes in the width of the strip to obtain (1) a constant distance between strip edges at the point 5 or 5′ where the weld is first made and (2) a constant diameter of the finished tube. The shaping operation as above described can, however, be carried out properly only if strip 1 is firmly guided, for example, by a guide member 9, up to a point close enough to shaping tool 2 to prevent buckling of said strip.

Figure 3:
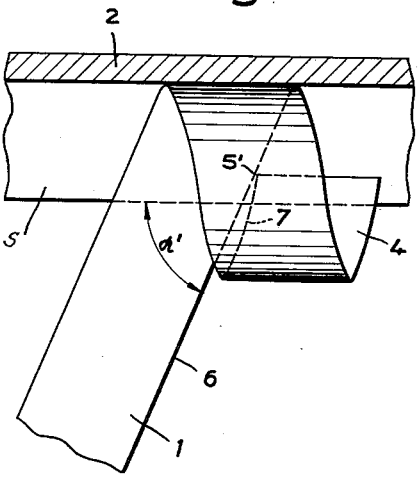
FIG. 3 shows a cross section taken along line III—III of FIG. 4 of another shaping tool according to the invention, likewise with a strip of material being fed thereto.
Figure 4:
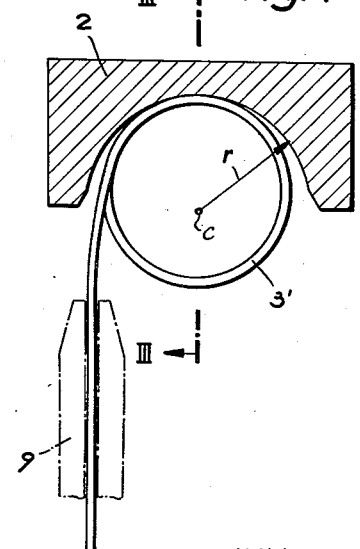
FIG. 4 shows a cross section of the shaping tool according to FIG. 3, to which a strip of material is being fed at such an angle that the radius of curvature of the tube to be made is smaller than the radius of curvature of the shaping tool.
Figure 7:
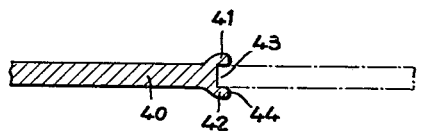
Figure 8:
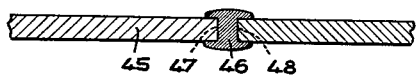
Figure 9:
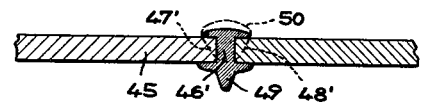
Figure 10:
Figure 11:
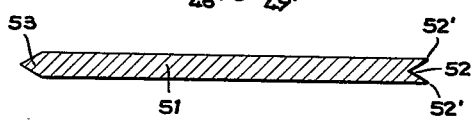
Figure 12:
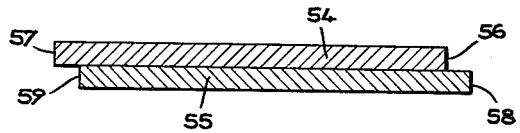
Figure 13:
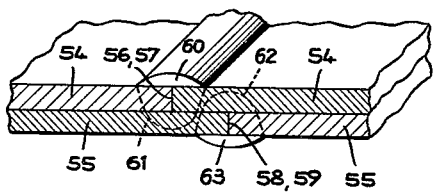
Figure 14:
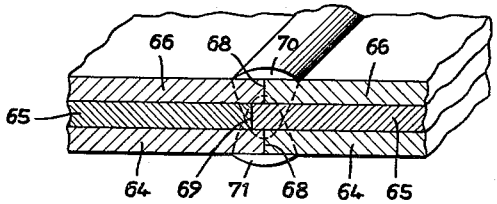
Figure 15:
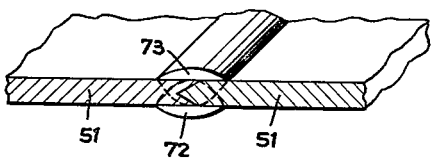
Figure 16:
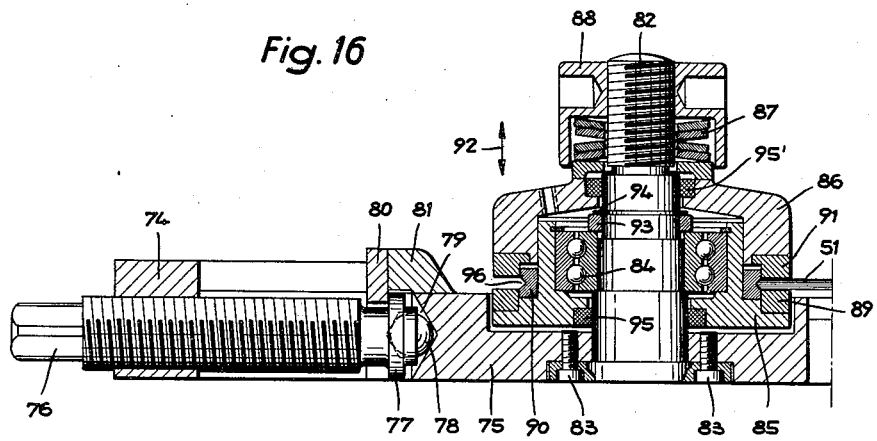
Figure 17:
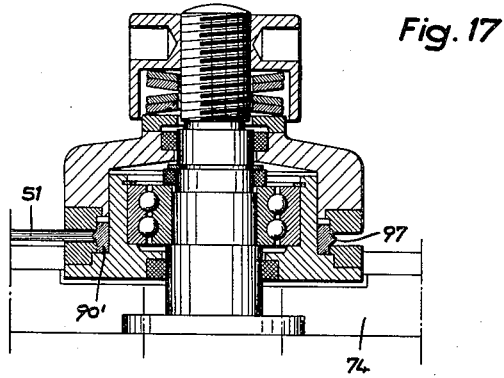

If strip 1 is fed toward shaping tool 2 at an angle α, as illustrated in FIG. 3, which is smaller than angle α in FIG. 1, the diameter of tube 3′ would be smaller than the diameter of tube 3. The final diameter of the tube to be produced therefore depends solely upon the angle α or α′ at which strip 1 is fed toward and into the shaping tool 2. That this is true has been proved by many tests which have actually been carried out. The only change occurring if the material is fed at a smaller angle so as to produce a tube of a smaller diameter is in the location of the point where the straight elge 6 abuts against the curved edge 7. As illustrated in FIG. 3, this contact point 5′ will then lie within the space which is surrounded by the shaping tool 2 rather than in front of the latter as shown in FIG. 1.

FIG. 5 shows a partial view of a machine which is designed to produce a tube from a straight strip of material in accordance with the present invention. Strip 1 is preferably fed by means of a plurality of rollers, not shown, at least one of which is driven, toward a feeding and guiding mechanism which essentially consists of one or more pairs of rollers 10 which are disposed above each other and a plurality of lateral rollers 11 and 12 which are disposed in pairs at opposite sides of strip 1 and parallel to each other. Rollers 10 are spaced from each other at a distance which corresponds to the thickness of strip 1, while rollers 11 and 12 are spaced at different distances from each other, namely, at those points which are relatively remote from shaping tool 2 at a distance which equals the greatest permissible width of the strip, and at those points which are closest to shaping tool 2 at a distance which equals the smallest permissible width of the strip. The distance between the intermediate pairs of rollers 11 and 12 between the remotest and closest pairs gradually reduces from such maximum distance to such minimum distance. While in FIG. 5 only one pair of superimposed rollers 10 has been illustrated, it is advisable to provide a plurality of such pairs at certain distances from each other in the longitudinal direction of strip 1. In the particular embodiment of the invention as illustrated in FIG. 5 it is assumed that the feed movement of strip 1 toward the machine is produced by means of two superimposed rollers 15 and 15′, as shown more particularly in FIG. 6. The lower feed roller 15′ which is rotatably mounted in a fixed position is driven by a motor 14 through a set of gears 13 and a shaft 13′, while the upper feed roller 15 is rotatably mounted within a supporting frame 16, 16′ which is adjustable in a vertical direction as indicated by the arrow 15″ and loaded by a weight member 16″. Intermediate the feed rollers 15, 15′ and the shaping tool 2, guide means 9 are mounted which extend to a point shortly in front of shaping tool 2 as indicated by the line 17, and which are preferably reinforced by ribs 18.

Shaping tool 2 is secured to the upper surface of a turntable 19 by means of a supporting bracket 20. Turntable 19 is rotatably mounted on a table, frame, or the like 21 which forms the supporting base of the machine. After the flat strip of material 1 has been passed between the upper and lower rollers 10, the lateral rollers 11 and 12 and feed rollers 15 and 15′, it engages at point 22 upon shaping tool 2, the cross-sectional shape of which corresponds to that illustrated in FIGS. 1 to 4. Through the gradual forward movement of strip 1 produced by feed rollers 15 and 15′, the strip is then spirally coiled to form a tube 3, 3′. Since the edges of the strip abutting against each other to form a helical seam are connected to each other at least by tack-welding, the tubular part emerging from shaping tool 2 will form a rigid element. This tubular part is guided by resting upon two balls 23 which form a lunette or backrest. Each of these balls 23 is rotatably mounted in a bearing 24 which, in turn, is adjustably mounted on a slide rest 25. The two bearings may, for example, be adjustable relative to each other by means of a spindle 26 which is provided with right-hand and left-hand threads. Slide rest 25 is mounted on a turntable 27 and may be moved back and forth in the direction indicated in FIG. 5 by the arrow 29 by means of a motor 28. If slide rest 25 is moved in one or the other direction, turntable 27 will also turn at a corresponding amount.

As long as the tubular part 3, 3′ does not as yet rest on balls 23 of the backrest, slide rest 25 may be adjusted relative to a frame 30 so that the position of balls 23 corresponds to the angle at which strip 1 is fed toward shaping tool 2. Frame 30 is secured in a stationary position by means of bolts 31 or the like. Slide rest 25 has rigidly secured thereto a table or the like 32 on which a carriage 33 is slidably mounted. One or more rollers 34 are rotatably mounted on carriage 33 and may be pressed against the tubular part 3, 3′ by means of an eccentric, not shown, which may be operated by a hand lever 35. If the roller or rollers 34 are moved into engagement with the outer surface of tube 3, 3′, and the tube while being made moves in the direction indicated by arrow 36, carriage 33 will shift likewise in the same direction and at the same speed along table 32. Since carriage 33 also supports a cutting tool, for example, a rotary saw 37 which is driven by a motor 38, this saw may be moved simultaneously with rollers 34 in the direction toward tube 3, 3′ and the latter may be cut into sections of any desired length. If the cutting mechanism is mounted and arranged as illustrated in FIG. 5, the tubular section will not be cut off completely and drop off until it has passed beyond slide rest 25. Rollers 34 are preferably made of rubber or provided with a rubber surface in order to increase their adhesion on tube 3, 3′. If a section of a certain length is to be cut off tube 3, 3′, it is merely necessary to operate lever 35 to move one of rollers 34 into engagement with the outer surface of tube 3, 3′ whereby the adjusted tube length will be cut off automatically within a plane which extends vertically to the axis of tube 3, 3′ since the tube moves not only in the direction of arrow 36 but also rotates about its own axis.

In order to press the edges of the strip which are to be welded together against each other under a certain pressure, it is advisable during the tube-shaping operation to pivot slide rest 25 at a small amount in the direction indicated by arrow 39. This small movement may be controlled, for example, by microswitches which operate motor 28 and effect such movement in accordance with the width of strip 1 shortly before it enters into shaping tool 2. These microswitches may be stationed with the pair of lateral rollers 11 and 12 nearest the shaping tool 2 where they can measure slight changes in width of the strip. In place of such a control of microswitches, it is also possible to subject slide rest 25 to the action of one or more springs which tend to pivot slide rest 25 in the direction of arrow 39. Such pivoting movement produces an initial tension in tube 3, 3′ while it is being made. Consequently, when the finished tube is subjected to an internal pressure, such pressure must first overcome the initial tension before it will act upon the strength of the material itself.

Although my invention has been illustrated and described with reference to the preferred embodiments thereof, I wish to have it understood that it is in no way Having thus fully disclosed by invention, what I claim is:

1. An apparatus for producing tubular bodies comprising, a shaping tool including an elongated member having a concave cylindrically curved surface having a longitudinal axis, means for feeding a flat strip of weldable material toward said surface with at least one edge thereof guided to define the path of the longitudinal axis of the strip, guide means for the top and bottom of the strip constituting a guiding edge which is close enough to said surface for the length thereof to prevent buckling of said strip, means movably mounting said shaping tool to vary the angle of feed between an edge of said flat strip and said longitudinal axis to provide an angle of feed which causes said strip to have an outer radius of curvature slightly smaller than the radius of curvature of said surface whereby said strip will touch said curved surface substantially along a tangential line, said guide member and said shaping tool cooperating to spirally curve said strip and bring the first curved edge into proximity with the adjacent incoming edge in an area free of obstruction and suitable for welding to form a tube with said guiding edge being exterior of said tube and means located in said area for welding the edge of the last formed complete spiral to an edge of the incoming strip from the inside of said tubular body.

2. An apparatus as defined in claim 1, further comprising means operable while said strip is being fed for movably supporting the tubular body as formed, and means for adjusting said supporting means angularly with respect to said one edge of said flat strip to attain a suitable welding proximity between the edge of the incoming strip and the adjacent first curved edge.

References Cited in the file of this patent

UNITED STATES PATENTS

| | | |
|---|---|---|
| 1,027,865 | Lloyd | May 28, 1912 |
| 1,537,150 | Solliday | May 12, 1925 |
| 1,550,153 | Emmet et al. | Aug. 18, 1925 |
| 1,659,792 | Thorsby | Feb. 21, 1928 |
| 1,739,774 | Thorsby | Dec. 17, 1929 |
| 1,765,368 | Frahm et al. | June 24, 1930 |
| 1,816,880 | Walton | Aug. 4, 1931 |
| 1,929,415 | Force | Oct. 10, 1933 |
| 2,063,798 | Firth | Dec. 8, 1936 |
| 2,282,176 | Fay et al. | May 5, 1942 |
| 2,837,626 | Buck et al. | June 3, 1958 |

FOREIGN PATENTS

| | | |
|---|---|---|
| 308,419 | Great Britain | Mar. 28, 1929 |
| 477,526 | Great Britain | Dec. 30, 1937 |
| 24,541 | Australia | Mar. 10, 1931 |
| 110,210 | Australia | Mar. 21, 1940 |
| 111,111 | Australia | July 22, 1940 |